US012617163B2

(12) United States Patent
Herman et al.

(10) Patent No.: US 12,617,163 B2
(45) Date of Patent: May 5, 2026

(54) AUTOMATED FIBER PLACEMENT OF GLASS FIBER THERMOPLASTIC TOW AS FIRST PLY

(71) Applicant: GOODRICH CORPORATION, Charlotte, NC (US)

(72) Inventors: Elizabeth A. Herman, Troy, NY (US); Iwona Wrobel, East Hartford, CT (US); Rony Ganis, Oakville (CA); Jason Bradley Allen, Waco, TX (US)

(73) Assignee: GOODRICH CORPORATION, Charlotte, NC (US)

( * ) Notice: Subject to any disclaimer, the term of this patent is extended or adjusted under 35 U.S.C. 154(b) by 42 days.

(21) Appl. No.: 18/516,767

(22) Filed: Nov. 21, 2023

(65) Prior Publication Data

US 2025/0162264 A1     May 22, 2025

(51) Int. Cl.
| | |
|---|---|
| *B29C 70/38* | (2006.01) |
| *B29C 70/02* | (2006.01) |
| B29K 307/04 | (2006.01) |
| B29K 309/08 | (2006.01) |

(52) U.S. Cl.
CPC ............ *B29C 70/382* (2013.01); *B29C 70/02* (2013.01); *B29K 2307/04* (2013.01); *B29K 2309/08* (2013.01)

(58) Field of Classification Search
CPC ..... B29C 70/382; B29C 70/384; B29C 70/38; B29C 70/386; B29C 70/388
See application file for complete search history.

(56) References Cited

U.S. PATENT DOCUMENTS

| | | | |
|---|---|---|---|
| 8,303,743 B2 | 11/2012 | Youn et al. | |
| 8,863,805 B2 | 10/2014 | Naumann | |
| 9,469,067 B2 | 10/2016 | Inston | |
| 11,668,275 B2 | 6/2023 | Tobin et al. | |
| 11,738,522 B2 | 8/2023 | Shpik | |
| 2010/0200168 A1* | 8/2010 | Oldani ................. | B29C 70/382 |
| | | | 156/441 |
| 2011/0272126 A1* | 11/2011 | Hamlyn ............... | B29C 70/382 |
| | | | 165/177 |
| 2016/0023433 A1* | 1/2016 | Langone ................ | B32B 27/40 |
| | | | 428/323 |
| 2017/0080646 A1* | 3/2017 | Vermilyea ............ | B29C 70/386 |
| 2019/0105857 A1* | 4/2019 | Derclaye .............. | B29C 70/386 |

(Continued)

FOREIGN PATENT DOCUMENTS

| | | |
|---|---|---|
| EP | 2433780 | 3/2012 |
| WO | 2016055700 | 4/2016 |
| WO | 2023152430 | 8/2023 |

OTHER PUBLICATIONS

European Patent Office, European Search Report dated Apr. 17, 2025 in Application No. 24213966.5.

*Primary Examiner* — Andrew L Swanson
(74) *Attorney, Agent, or Firm* — SNELL & WILMER L.L.P.

(57) ABSTRACT

A method of manufacturing a thermoplastic part is disclosed herein. The method includes applying a glass fiber thermoplastic material onto a substrate, applying a carbon fiber thermoplastic material onto the substrate and over the glass fiber material, heating the carbon fiber material to generate heat in the carbon fiber material to heat the glass fiber material, and pressing the glass fiber material and the carbon fiber material onto the substrate.

17 Claims, 4 Drawing Sheets

(56) References Cited

U.S. PATENT DOCUMENTS

| 2020/0406580 A1* | 12/2020 | Ogale | ................... B29C 70/382 |
| 2023/0226779 A1 | 7/2023 | Huang et al. | |
| 2023/0387768 A1* | 11/2023 | Hauber | ................. H02K 15/14 |

* cited by examiner

300

Receive a mandrel — 302

Apply a glass tow and a carbon tow to the mandrel using an AFP tool — 304

Perform a second pass using AFP tool to add pressure and heat to the glass tow and the carbon tow — 306

Apply a second carbon tow layer over the mandrel and the first carbon tow layer — 308

AUTOMATED FIBER PLACEMENT OF GLASS FIBER THERMOPLASTIC TOW AS FIRST PLY

FIELD

The present disclosure generally relates to manufacturing thermoplastic structures, and more specifically, to manufacturing thermoplastic structures having a glass layer as the first ply.

BACKGROUND

Thermoplastic materials are being used with increasing frequency in various industries, including aerospace. Thermoplastic parts can be manufactured using automated fiber placement (AFP) fabrication that includes dispensing a thermoplastic material onto a surface and consolidating the thermoplastic material on the surface. This process utilizes the thermally conductive nature of the fibers being dispensed to perform the consolidation. Some fiber materials react adversely with the underlying substrate on which it is dispensed.

SUMMARY

A method of manufacture is provided, comprising applying a glass fiber thermoplastic material onto a substrate, applying a carbon fiber thermoplastic material onto the substrate and over the glass fiber material, heating the thermoplastic material to generate heat in the carbon fiber material to heat the glass fiber material and pressing the glass fiber material and the carbon fiber material onto the substrate.

A system for manufacturing a thermoplastic component is provided, the system comprising a spool of glass fiber thermoplastic material, a spool of carbon fiber thermoplastic material, and a mandrel, wherein the system is configured to dispense the glass fiber thermoplastic material from the spool of glass fiber thermoplastic material as a glass fiber layer onto the mandrel, dispense the carbon fiber thermoplastic material from the spool of carbon fiber thermoplastic material as a layer onto the glass fiber layer, heat the carbon fiber thermoplastic tow, and press the carbon fiber thermoplastic tow and the glass fiber thermoplastic tow onto the mandrel.

A method of manufacturing a thermoplastic part is provided, comprising, dispensing a glass fiber thermoplastic tow onto a mandrel, the glass fiber thermoplastic tow having a first width, dispensing a carbon fiber thermoplastic tow onto the glass fiber thermoplastic tow, the carbon fiber thermoplastic tow having a second width that is less than the first width, directing a laser onto the carbon fiber thermoplastic tows while dispensing the glass fiber thermoplastic tow and the carbon fiber thermoplastic tow, the laser generating heat in the carbon fiber thermoplastic tow that is transferred to the glass fiber thermoplastic tow, and applying, by a roller, a pressure onto the carbon fiber thermoplastic tow to affix the glass fiber thermoplastic tow to the mandrel.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
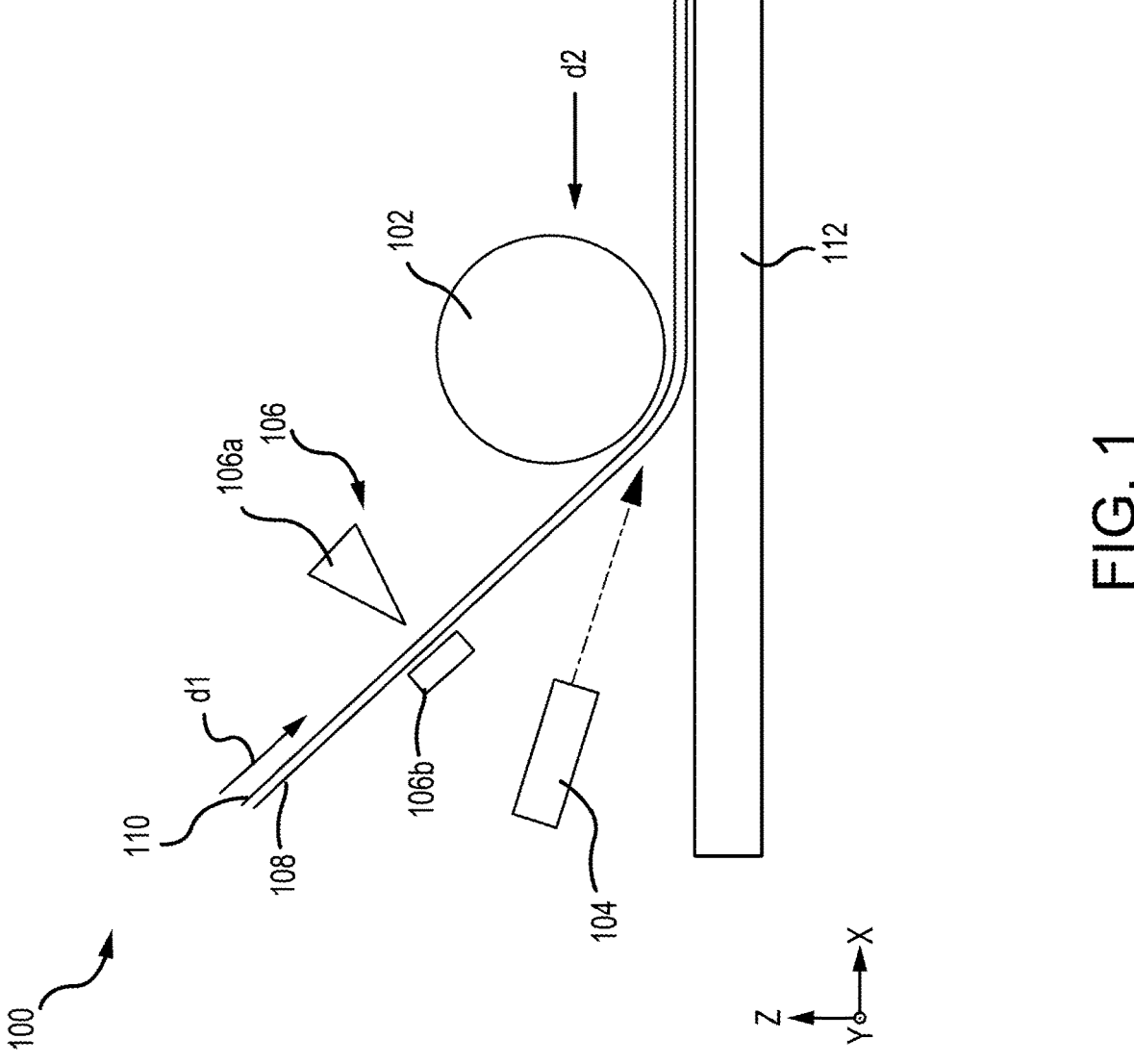
FIG. 1 illustrates an automated fiber placement machine for installing glass fiber thermoplastic tow as the first ply, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein are processes and methods for forming thermoplastic components using automated fiber placement (AFP) machines. In various embodiments, AFP machine dispenses a carbon fiber thermoplastic material, or tow, onto a substrate. In various embodiments, the AFP machine generates heat within the carbon fiber thermoplastic tow using a laser. In various embodiments, the AFP machine utilizes the thermal conductivity of the carbon fibers for transmitting the heat from the laser throughout the thermoplastic tow. In various embodiments, the heat causes the resin within the carbon fiber thermoplastic tow to melt so that the tow is welded to the underlying substrates. In various embodiments, the underlying substrate may adversely react with the tow fibers. For example, placing a carbon tow over an aluminum substrate results in galvanic corrosion that tends to decrease the structural integrity of the thermoplastic part.

Disclosed herein, in various embodiments, a glass fiber thermoplastic tow, is dispensed simultaneously with a carbon fiber thermoplastic tow. In various embodiments, the glass fiber thermoplastic tow is dispensed so that it is disposed between the substrate and the carbon fiber thermoplastic tow. In various embodiments, the glass fiber thermoplastic tow insulates the substrate from the carbon fiber thermoplastic tow to prevent adverse reactions (e.g., galvanic corrosion, electrical insulation, etc.). In various embodiments, the laser is directed to the carbon tow and through the glass fiber thermoplastic tow generates heat within the carbon tow which transfers into the glass fiber thermoplastic tow so that that the glass fiber thermoplastic tow and carbon tow weld to the substrate. In various embodiments, the substrate may be a mold or a mandrel for forming the thermoplastic part. The processes and methods disclosed herein allow for the manufacture of components using glass fiber thermoplastics that was not previously possible.

The terminology "weld", "join", or "melt" are used interchangeably to mean the consolidation of thermoplastic material using heat and pressure, or adhering thermoplastic materials together to form a structure. The word "bond" is not typically used in reference to thermoplastics as this implies a thermoset adhesive is being applied, possibly on a surface specifically prepared or activated for that adhesive, which subsequently undergoes a permanent chemical reaction.

Referring now to FIG. 1, an automated fiber placement (AFP) machine 100 is illustrated, in accordance with various embodiments. AFP machine 100 includes a roller 102, a laser 104, and a cutting unit 106. AFP machine 100 further includes a spool of glass fiber thermoplastic tow 108 and a spool of carbon fiber thermoplastic tow 110. AFP machine 100 may, in various embodiments, further include a power source, a base, and/or wheels. AFP machine 100 is configured to dispense carbon fiber thermoplastic tow 110 from the spool of carbon fiber thermoplastic material and to dispense glass fiber thermoplastic tow 108 from the spool of glass fiber thermoplastic material. In various embodiments, the spool may be any form of material container from which either glass fiber thermoplastic tow 108 or carbon fiber thermoplastic tow 110 may be dispensed.

AFP machine 100 is configured to dispense glass fiber thermoplastic tow 108 and carbon fiber thermoplastic tow 110 in a first direction d1 (e.g., the positive x-direction and the negative z-direction) toward a mandrel 112. In various embodiments, mandrel 112 may also be referred to as a tool, a form, a liner, or a template. AFP machine 100 moves in a second direction d2 (e.g., in the negative x-direction) along the surface of mandrel 112 while dispensing glass fiber thermoplastic tow 108 and carbon fiber thermoplastic tow 110 in the first direction. In this manner, glass fiber thermoplastic tow 108 and carbon fiber thermoplastic tow 110 are placed on the surface of mandrel 112 while under tension.

Laser 104 directs light through the glass fiber thermoplastic tow 108 and onto the carbon fiber thermoplastic tow 110 (e.g., in the negative z-direction) to generate heat in the carbon fiber thermoplastic tow 110. That is, the laser light, or pulsed light, passes through glass fiber thermoplastic tow 108 and contacts carbon fiber thermoplastic tow 110 thereby generating heat in carbon fiber thermoplastic tow 110. The heat generated in carbon fiber thermoplastic tow 110 is transferred by contact to glass fiber thermoplastic tow 108. This heat transfer melts the thermoplastic resin in glass fiber thermoplastic tow 108 so that glass fiber thermoplastic tow 108 can tackify to mandrel 112, holding glass fiber thermoplastic tow 108 in place on mandrel 112. As described herein, tackify, or tackifying, is different than bonding in that tackifying makes a material (e.g., glass fiber thermoplastic tow 108) sufficiently sticky or tacky to temporarily attach to a surface (e.g., mandrel 112). This is in contrast to bonding which creates a permanent bond using an adhesive.

Roller 102 applies a pressure to carbon fiber thermoplastic tow 110 and glass fiber thermoplastic tow 108 (e.g., in the negative z-direction) to affix carbon fiber thermoplastic tow 110 and glass fiber thermoplastic tow 108 to mandrel 112. That is, the pressure from roller 102 welds carbon fiber thermoplastic tow 110 to glass fiber thermoplastic tow 108 and affixes glass fiber thermoplastic tow 108 to mandrel 112. The pressure applied by roller 102 may be about 5 psi (34 kPa) to about 120 psi (827 kPa), about 20 psi (137 kPa) to about 100 psi (689 kPa), and more specifically, about 50 psi (344 kPa) to about 80 psi (551 kPa). In various embodiments, the pressure applied by roller 102 may be greater than 120 psi (827 kPa).

Cutting unit 106 includes a cutting edge 106a and a backstop 106b. Cutting edge 106a cuts through both carbon fiber thermoplastic tow 110 and glass fiber thermoplastic tow 108. Glass fiber thermoplastic tow 108 and carbon fiber thermoplastic tow 110 are generally laid in a single direction, second direction d2, at a time. At the end of the run, carbon fiber thermoplastic tow 110 and glass fiber thermoplastic tow 108 are cut and welded to mandrel. AFP machine 100 may then be pointed in a different direction and the process continues.

In various embodiments, placing a first layer of glass fiber thermoplastic tow 108 and a second layer of carbon fiber thermoplastic tow 110 is intended to be the first layer of a thermoplastic part. With the first layer (e.g., glass fiber thermoplastic tow 108 and carbon fiber thermoplastic tow 110) in place, additional layers of carbon fiber thermoplastic tow 110 are applied and welded to the first layer of carbon fiber thermoplastic tow 110 to manufacture the thermoplastic part. Each successive layer of carbon fiber thermoplastic tow 110 is welded to the previous layers of carbon fiber thermoplastic tow 110. The first layer of glass fiber thermoplastic tow 108 insulates mandrel 112 from the layers of carbon fiber thermoplastic tow 110. In various embodiments, glass fiber thermoplastic tow 108 is an electric insulator. In various embodiments, glass fiber thermoplastic tow 108 is an insulator against galvanic corrosion.

Figures 2A, 2B:
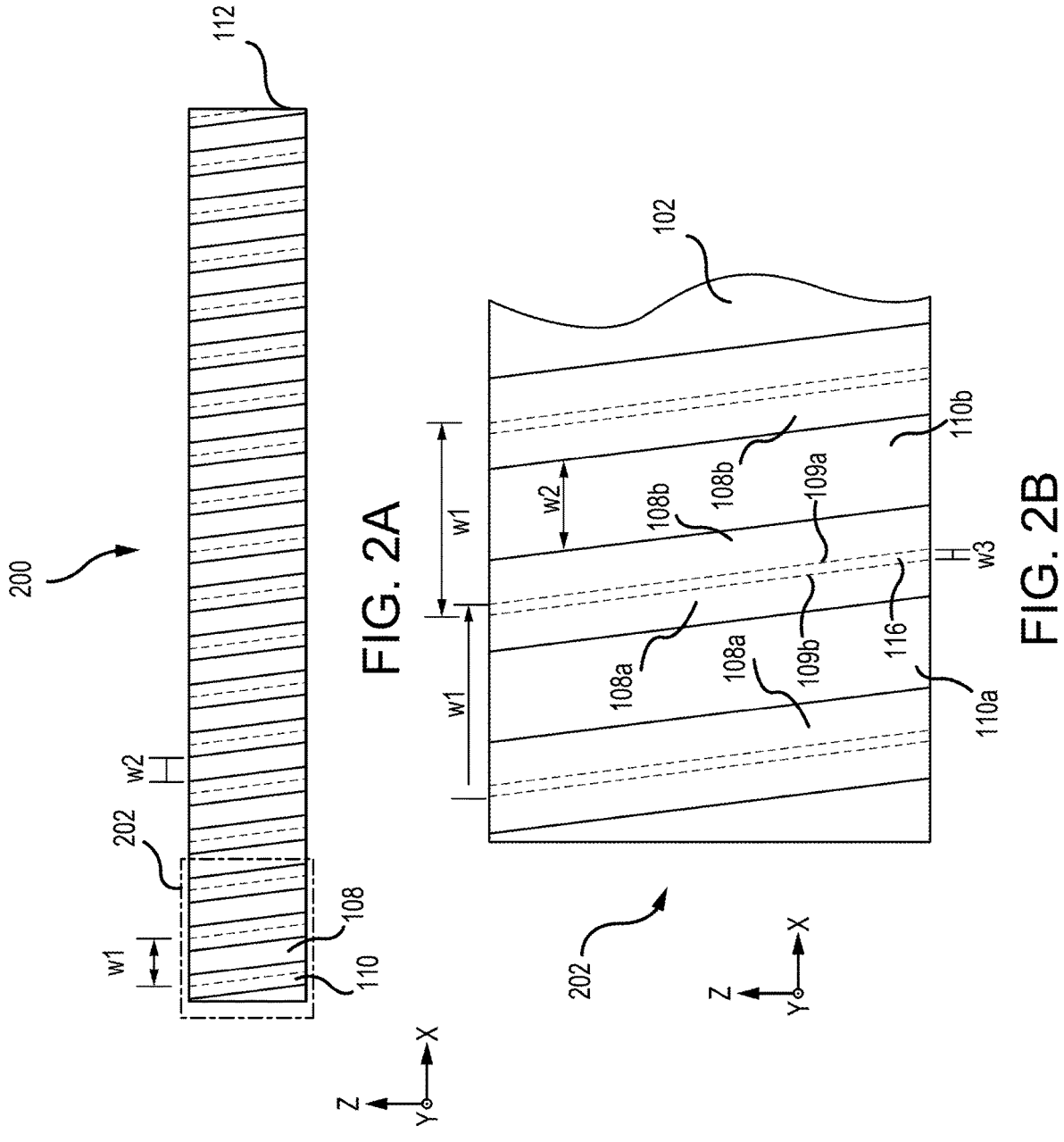
FIGS. 2A, 2B, and 2C illustrate a structure formed using an automated fiber placement machine having a glass fiber thermoplastic tow as the first ply, in accordance with various embodiments.
Figure 2C:
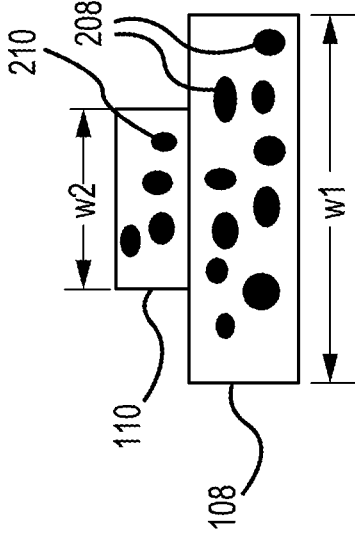

Referring now to FIGS. 2A-2C, thermoplastic part 200 including a glass fiber layer and a carbon fiber layer is illustrated, in accordance with various embodiments. FIG. 2A illustrates a first layer of glass fiber thermoplastic tow 108 and carbon fiber thermoplastic tow 110 formed over mandrel 112. FIG. 2B illustrates a close up of the first layer including overlap of each pass of glass fiber thermoplastic tow 108. FIG. 2C illustrates a cross section of glass fiber thermoplastic tow 108 and carbon fiber thermoplastic tow 110. The glass fiber layer is made from glass fiber thermoplastic tow 108 and the carbon fiber layer is made from carbon fiber thermoplastic tow 110. In illustrated embodiment, mandrel 112 is a simple mandrel with glass fiber thermoplastic tow 108 and carbon fiber thermoplastic tow 110 being applied in straight lines that are angled with respect to the edges of mandrel 112 (e.g., the positive x-direction and the negative x-direction). This is for ease of description. It should be understood and appreciated that the process and methods discussed herein may be applied to any mandrel, either simple or complex.

Glass fiber thermoplastic tow 108 has edges represented by dashed lines and has a width w1 (e.g., in the x-direction). Glass fiber thermoplastic tow 108 includes a plurality of glass fibers 208 and thermoplastic resin. Width w1 is about ⅛ inch (3.1 mm) to about 1 inch (25.4 mm), and more specifically, about ¼ inch (6.3 mm) to about ½ inch (12.7 mm). Glass fiber thermoplastic tow 108, as described above in FIG. 1, is the first layer placed on mandrel 112 and is in contact with mandrel 112. Glass fiber thermoplastic tow 108 provides electrical insulation and/or corrosion insulation between mandrel 112 and carbon fiber thermoplastic tow 110. For example, galvanic corrosion occurs when a material containing carbon fiber is placed directly in contact with aluminum metal.

Carbon fiber thermoplastic tow 110 has edges represented by solid lines and has a width w2 (e.g., in the x-direction). Carbon fiber thermoplastic tow 110 includes a plurality of carbon fibers 210 and thermoplastic resin. Width w2 is less than width w1. Width w2 is about 1/16 inch (1.5 mm) to about 15/16 inch (23.8 mm), and more specifically, about ⅛ inch (3.1 mm) to about ¼ inch (6.35 mm). The difference in width w2 and width w1 accounts for overlap of glass fiber thermoplastic tow 108 with each successive pass.

FIG. 2B illustrates a close up of the portion of thermoplastic part 200 indicated by box 202 in FIG. 2A including the overlap of glass fiber thermoplastic tow 108. By way of example, close up 202 illustrates a first glass fiber thermoplastic tow 108a, having first width w1, and a first carbon fiber thermoplastic tow 110a, having second width w2, that is centered on first glass fiber thermoplastic tow 108a. That is, the edges of first glass fiber thermoplastic tow 108a extend beyond the edges of first carbon fiber thermoplastic two 110a (e.g., in along the x-axis). Close up 202 further illustrates a second glass fiber thermoplastic tow 108b, having first width w1, and a second carbon fiber thermoplastic tow 110b, having second width w2, that is centered on second glass fiber thermoplastic tow 108b. That is, the edges of second glass fiber thermoplastic tow 108b extend beyond the edges of second carbon fiber thermoplastic two 110b (e.g., in along the x-axis). First glass fiber thermoplastic tow 108a has an edge 114a and second glass fiber thermoplastic tow 108b has an edge 114b that overlaps edge 114a.

As illustrated in FIG. 2B, each glass fiber thermoplastic tow 108 overlaps an adjacent glass fiber thermoplastic tow 108 by a width w3. For example, an overlap 116 is created by second glass fiber thermoplastic tow 108b having edge 109b overlapping first glass fiber thermoplastic tow 108a having edge 109a. Width w3 is about 0 inch to about ⅓ inch (8.4 mm), and more specifically, about ⅛ inch (3.1 mm) to about ¼ inch (6.3 mm). The overlap of glass fiber thermoplastic tow 108 provides the electrical and/or corrosion insulation between mandrel 112 and carbon fiber thermoplastic tow 110. The amount of overlap may be adjusted based on the design and use of thermoplastic part 200. For example, a first glass fiber thermoplastic tow 108 may abut a second or adjacent glass fiber thermoplastic tow 108 with no overlap.

Overlapping first glass fiber thermoplastic tow 108 and a second or adjacent glass fiber thermoplastic tow 108 may provide improved insulation characteristics. Therefore, glass fiber thermoplastic tow 108 being wider than carbon fiber thermoplastic tow 110, width w1 being greater than width w2, allows glass fiber thermoplastic tow 108 to overlap without carbon fiber thermoplastic tow 110 overlapping, as illustrated in FIGS. 2A and 2B. After an insulation layer of overlapping glass fiber thermoplastic tow 108, including carbon fiber thermoplastic tow 110 disposed thereon, is deposited, a second layer of carbon fiber thermoplastic tow 110 is deposited over the insulation layer. The second layer of carbon fiber thermoplastic tow 110 being welded to the carbon fiber thermoplastic tow 110 of the insulation layer.

Figure 3:
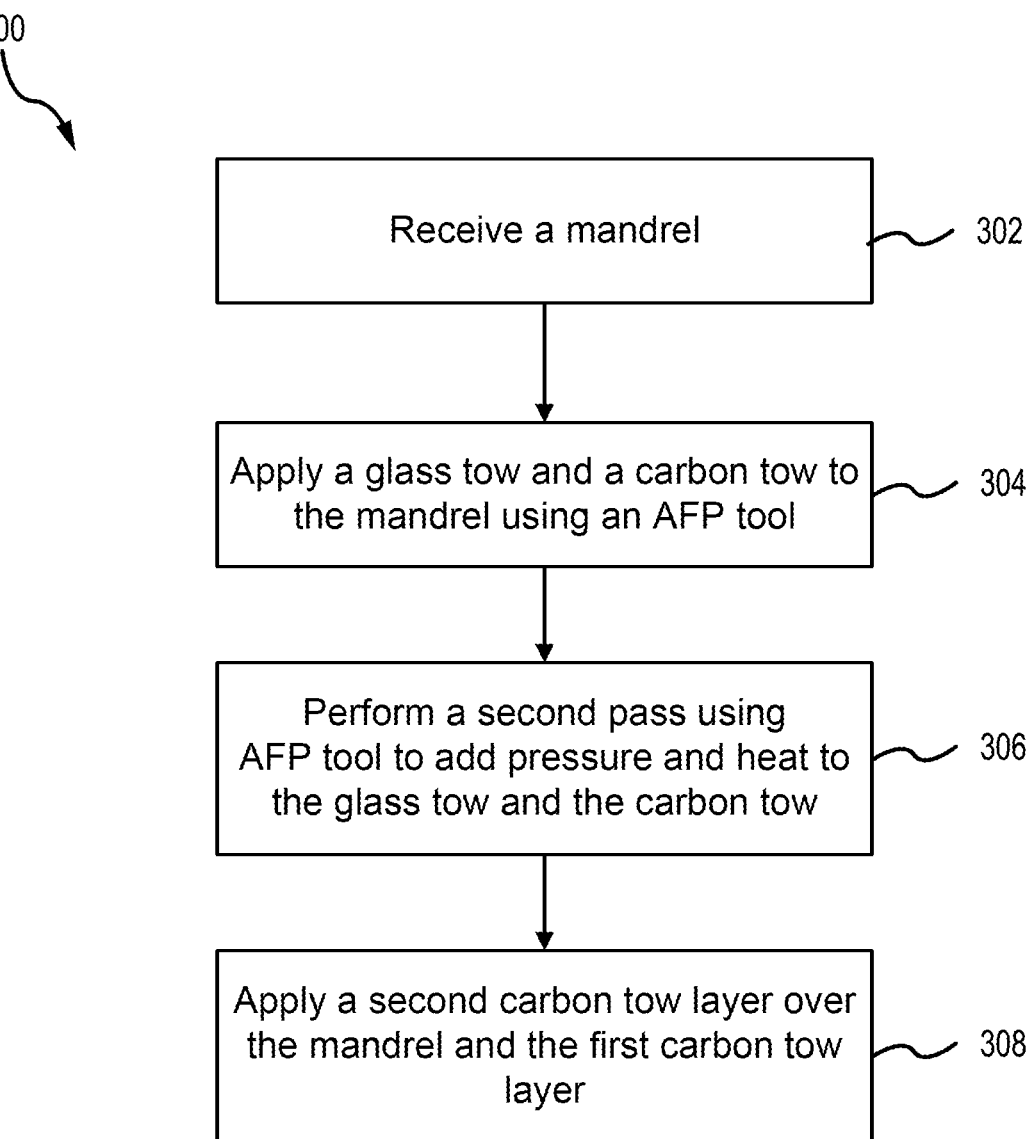
FIG. 3 illustrates a flow diagram for a method forming a structure using a glass two for the first ply, in accordance with various embodiments.

Referring now to FIG. 3, a flow diagram of a method 300 of manufacturing a thermoplastic part is illustrated, in accordance with various embodiments. At block 302, a mandrel (e.g., mandrel 112) is received. In various embodiments, mandrel 112 includes a metal. In various embodiments, the metal may react adversely (e.g., galvanic corrosion) with carbon fiber (e.g., carbon fiber thermoplastic tow 110).

At block 304, an automated fiber placement (AFP) machine (e.g., AFP machine 100) is used to place the first layer including a glass fiber thermoplastic tow and a carbon fiber thermoplastic tow over mandrel 112. The glass fiber thermoplastic tow (e.g., glass fiber thermoplastic tow 108) is placed directly on mandrel 112 and the carbon fiber thermoplastic tow (e.g., carbon fiber thermoplastic tow 110) is placed directly on glass fiber thermoplastic tow 108 with glass fiber thermoplastic tow 108 insulating mandrel 112 from carbon fiber thermoplastic tow 110. In various embodiments, glass fiber thermoplastic tow 108 and carbon fiber thermoplastic tow 110 are placed simultaneously on mandrel 112. In various embodiments, glass fiber thermoplastic tow 108 is applied directly to, and contacting, mandrel 112. In various embodiments, carbon fiber thermoplastic tow 110 is applied directly to, and contacting, glass fiber thermoplastic tow 108. In various embodiments, glass fiber thermoplastic tow 108 prevents carbon fiber thermoplastic tow 110 from contacting mandrel 112. In various embodiments, a second or adjacent glass fiber thermoplastic tow 108 overlaps the first glass fiber thermoplastic tow 108.

In various embodiments, AFP machine 100 may be used as described above in FIGS. 1 and 2A-2C. That is, a laser (e.g., laser 104) may be used during placement with the laser generating heat in carbon fiber thermoplastic tow 110. The heat generated in carbon fiber thermoplastic tow 110 is transferred to glass fiber thermoplastic tow 108 to tackify glass fiber thermoplastic tow 108. A roller (e.g., roller 102) applies pressure to affix glass fiber thermoplastic tow 108 to mandrel 112 and to weld carbon fiber thermoplastic tow 110 to glass fiber thermoplastic tow 108.

At block 306, AFP machine 100 may be used to perform a second pass over the first layer of glass fiber thermoplastic tow 108 and carbon fiber thermoplastic tow 110. In the second pass, additional heat and pressure may be applied to the first layer to affix glass fiber thermoplastic tow 108 to mandrel 112 and to weld carbon fiber thermoplastic tow 110 to glass fiber thermoplastic tow 108.

At block 308, AFP machine 100 is used to apply a second layer of carbon fiber thermoplastic tow 110 over the first layer. The second layer carbon fiber thermoplastic tow 110 adheres and welds to glass fiber thermoplastic tow 108 and carbon fiber thermoplastic tow 110 in the first layer. AFP machine 100 may be used to apply additional layers of carbon fiber thermoplastic tow 110 over previous layers of carbon fiber thermoplastic tow 110 to manufacture a thermoplastic part.

The processes and methods disclosed herein enables the manufacture of components using thermoplastic materials that was not previously possible. Furthermore, they enable the construction of light weight structural components that include a metal liner, or mandrel. In various embodiments, the metal liner may include aluminum, magnesium, or other anodic materials.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for manufacturing a thermoplastic component, the system comprising:
a spool of glass fiber thermoplastic material;
a spool of carbon fiber thermoplastic material;
a laser; and
a mandrel,
wherein the system is configured to:
    dispense the glass fiber thermoplastic material from the spool of glass fiber thermoplastic material as a glass fiber thermoplastic tow onto the mandrel;
    dispense the carbon fiber thermoplastic material from the spool of carbon fiber thermoplastic material as a carbon fiber thermoplastic tow onto the glass fiber thermoplastic tow;
    heat the carbon fiber thermoplastic tow by directing the laser through the glass fiber thermoplastic tow and onto the carbon fiber thermoplastic tow while dispensing the glass fiber thermoplastic tow; and
    press the carbon fiber thermoplastic tow and the glass fiber thermoplastic tow onto the mandrel.

2. The system of claim 1, further comprising:
a roller configured to press the carbon fiber thermoplastic tow and the glass fiber thermoplastic tow onto the mandrel.

3. The system of claim 1, wherein the glass fiber thermoplastic tow has a first width and the carbon fiber thermoplastic tow has a second width that is less than the first width.

4. The system of claim 1, wherein the system is further configured to:
dispense the glass fiber thermoplastic tow as a first glass fiber thermoplastic tow; and
dispense a second glass fiber thermoplastic tow adjacent to and overlapping the first glass fiber thermoplastic tow.

5. The system of claim 1, wherein the system is further configured to:
simultaneously dispense the glass fiber thermoplastic tow and the carbon fiber thermoplastic tow; and
heat the carbon fiber thermoplastic tow through the glass fiber thermoplastic tow while dispensing the glass fiber thermoplastic tow and the carbon fiber thermoplastic tow.

6. The system of claim 1, wherein the glass fiber thermoplastic tow and the carbon fiber thermoplastic tow form a first layer on the mandrel, the system further configured to:

dispense a second layer of the carbon fiber thermoplastic tow onto the first layer;

heat the second layer of carbon fiber thermoplastic tow; and press the second layer of carbon fiber thermoplastic tow onto the first layer.

7. The system of claim 1, wherein the mandrel includes an anodic metal.

8. The system of claim 7, wherein the anodic metal is one of aluminum or magnesium.

9. A method of operating the system of claim 1, comprising:

dispensing the glass fiber thermoplastic tow onto the mandrel, the glass fiber thermoplastic tow having a first width;

dispensing the carbon fiber thermoplastic tow onto the glass fiber thermoplastic tow, the carbon fiber thermoplastic tow having a second width that is less than the first width;

heating the carbon fiber plastic tow by directing the laser through the glass fiber thermoplastic tow and onto the carbon fiber thermoplastic tow while dispensing the glass fiber thermoplastic tow and the carbon fiber thermoplastic tow, the laser generating heat in the carbon fiber thermoplastic tow that is transferred to the glass fiber thermoplastic tow; and applying, by a roller, a pressure onto the carbon fiber thermoplastic tow to affix the glass fiber thermoplastic tow to the mandrel.

10. A system for manufacturing a thermoplastic component, the system comprising:

a spool of glass fiber thermoplastic material;

a spool of carbon fiber thermoplastic material; and a mandrel, wherein the system is configured to:

simultaneously dispense the glass fiber thermoplastic material from the spool of glass fiber thermoplastic material as a glass fiber thermoplastic tow onto the mandrel and dispense the carbon fiber thermoplastic material from the spool of carbon fiber thermoplastic material as a carbon fiber thermoplastic tow onto the glass fiber thermoplastic tow;

heat the carbon fiber thermoplastic tow through the glass fiber thermoplastic tow while dispensing the glass fiber thermoplastic tow and the carbon fiber thermoplastic tow; and press the carbon fiber thermoplastic tow and the glass fiber thermoplastic tow onto the mandrel.

11. The system of claim 10, further comprising:

a laser, wherein the laser is directed through the glass fiber thermoplastic tow and onto the carbon fiber thermoplastic tow while dispensing the glass fiber thermoplastic tow, the laser generating heat in the carbon fiber thermoplastic tow.

12. The system of claim 10, further comprising:

a roller configured to press the carbon fiber thermoplastic tow and the glass fiber thermoplastic tow onto the mandrel.

13. The system of claim 10, wherein the glass fiber thermoplastic tow has a first width and the carbon fiber thermoplastic tow has a second width that is less than the first width.

14. The system of claim 10, wherein the system is further configured to:

dispense the glass fiber thermoplastic tow as a first glass fiber thermoplastic tow; and dispense a second glass fiber thermoplastic tow adjacent to and overlapping the first glass fiber thermoplastic tow.

15. The system of claim 10, wherein the glass fiber thermoplastic tow and the carbon fiber thermoplastic tow form a first layer on the mandrel, the system further configured to:

dispense a second layer of the carbon fiber thermoplastic tow onto the first layer;

heat the second layer of carbon fiber thermoplastic tow; and press the second layer of carbon fiber thermoplastic tow onto the first layer.

16. The system of claim 10, wherein the mandrel includes an anodic metal.

17. The system of claim 16, wherein the anodic metal is one of aluminum or magnesium.

* * * * *